US008078599B2

(12) United States Patent  (10) Patent No.: US 8,078,599 B2
Kimura  (45) Date of Patent: Dec. 13, 2011

(54) METHOD AND SYSTEM FOR EVALUATING ENVIRONMENTAL IMPACT OCCURRING DURING AN ACTIVITY CYCLE

(75) Inventor: Yuichi Kimura, Kanagawa (JP)

(73) Assignee: Ricoh Company, Ltd., Yokohama-shi (JP)

( * ) Notice: Subject to any disclaimer, the term of this patent is extended or adjusted under 35 U.S.C. 154(b) by 1099 days.

(21) Appl. No.: 11/703,822

(22) Filed: Feb. 8, 2007

(65) Prior Publication Data

US 2007/0185691 A1   Aug. 9, 2007

(30) Foreign Application Priority Data

Feb. 9, 2006  (JP) ................................ 2006-032804

(51) Int. Cl.
   *G66F 7/00*  (2006.01)
(52) U.S. Cl. ........................... 707/705; 702/189; 705/28
(58) Field of Classification Search ............. 707/999.01, 707/999.104, 705; 702/189; 705/28
   See application file for complete search history.

(56) References Cited

U.S. PATENT DOCUMENTS

| | | | | |
|---|---|---|---|---|
| 7,346,459 | B2 * | 3/2008 | Sakurai et al. ................... | 702/30 |
| 7,412,365 | B2 * | 8/2008 | Kobayashi et al. ............... | 703/6 |
| 2001/0025282 | A1 * | 9/2001 | Ohishi et al. ................ | 707/104.1 |
| 2002/0148090 | A1 * | 10/2002 | Kaburagi et al. ............ | 29/403.1 |
| 2002/0156545 | A1 * | 10/2002 | Sekino et al. ..................... | 705/7 |

FOREIGN PATENT DOCUMENTS

| | | |
|---|---|---|
| EP | 1 193 628 | 4/2002 |
| EP | 1 207 469 | 5/2002 |
| EP | 1 324 251 | 7/2003 |

OTHER PUBLICATIONS

Anderl et al. (1999). "Information Modelling Using Product Life Cycle Views" *Information Infrastructure Systems for Manufacturing II. IFIP TC5 Wg5.3/5.7 Third International Working Conference on the Design of Information Infrastructure Systems for Manufacturing (DIISM '98)*: 153-162.

French and Geldermann. (2005) "The Varied Contexts of Environmental Decision Problems and Their Implications for Decision Support," *Environmental Science & Policy 8*: 378-391.

(Continued)

*Primary Examiner* — Shew-Fen Lin
*Assistant Examiner* — Jieying Tang
(74) *Attorney, Agent, or Firm* — Morrison & Foerster LLP

(57) ABSTRACT

A system for evaluating an environmental impact during a life cycle of an activity includes a controlling unit, which controls the system with a plurality of data storage elements connected to the controlling unit. The plurality of data storage elements includes a first data storage element, a second data storage element, a third data storage element, and a fourth data storage element. The first data storage element stores a first data type for each item to be used for the activity as life cycle inventory data. The second data storage element stores a second data type for each item, which includes grade information and recycle ratio information. The third data storage element stores a third data type for each item as modified life cycle inventory data. The third data type is obtained by modifying the first data type with the second data type. The fourth data storage element stores impact-coefficient data for each item.

10 Claims, 9 Drawing Sheets

OTHER PUBLICATIONS

Frischknecht and Rebitzer. (2005). "The Ecoinvent Database System: A Comprehensive Web-Based LCA Database," *Journal of Cleaner Production* 13:1337-1343.

Itsubo and Inaba. (2001). "Development of Endpoint-type Methodology of LCIA in Japan," *Environmentally Conscious Design and Inverse Manufacturing; Proceedings of EcoDesign 2001: Second International Symposium*, Tokyo, Japan::826-831.

Rebitzer and Buxmann. (2005). "The Role and Implementation of LCA Within Life Cycle Management At Alcan," *Journal of Cleaner Production* 13:1327-1335.

Rydh and Sun. (2005). "Life Cycle Inventory Data for Materials Grouped According to Environmental and Material Properties," *Journal of Cleaner Production* 13:1258-1268.

Tanaka et al. (2003). "Development of Pluggable LCA System," *Proceedings of EcoDesign 2003: Third International Symposium on Environmentally Conscious Design and Inverse Manufacturing*, Tokyo, Japan: 687-691.

Tummala and Koenig. (1994). "Models for Life Cycle Assessment of Manufactured Products," *Electronics and the Environment, IEEE International Symposium*, San Francisco, CA: 94-99.

Wada and Miura. (1997). "A Quantitative Evaluation Method for the Environmental Impact of Product Recycling and its Application," *Technology Reports of Kansai University* 39: 185-196.

Extended European Search Report dated May 22, 2007, directed to counterpart EP application No. 07102028.3.

\* cited by examiner

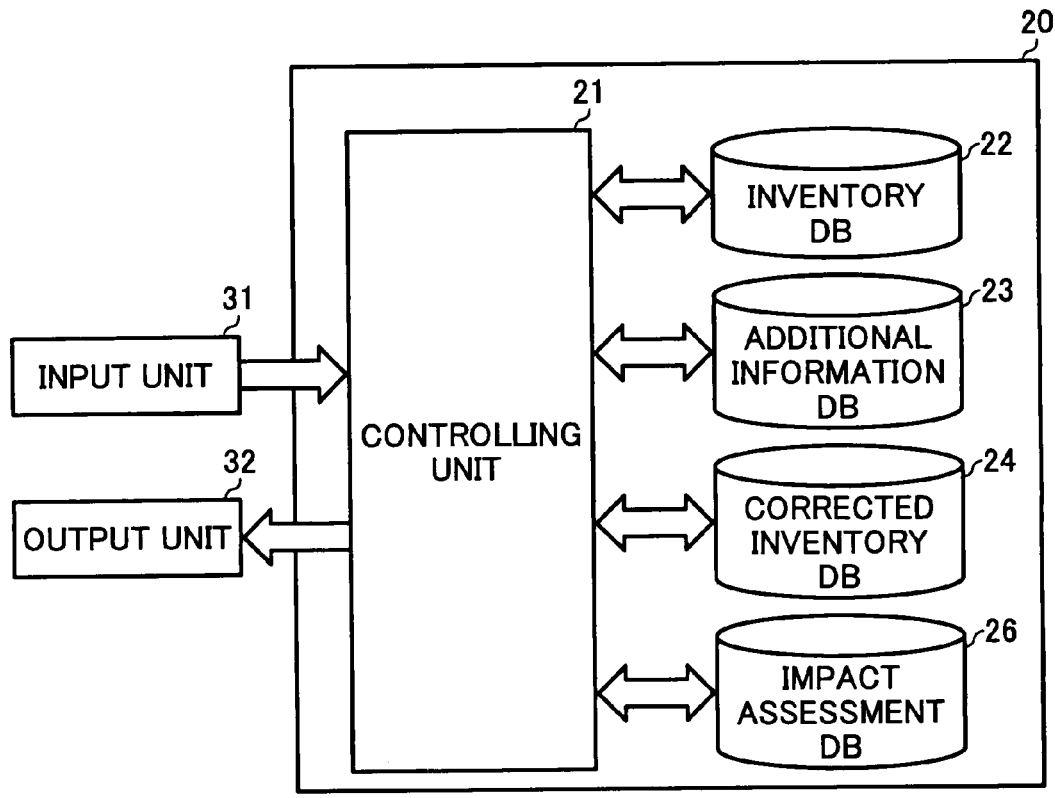

FIG. 6

CORRECTED INVENTORY DB

PRODUCT: STAINLESS STEEL

| ITEM | REQUIRED AMOUNT PER UNIT |
|---|---|
| IRON | A Kg/Kg |
| NICKEL | B Kg/Kg |
| ⋮ | ⋮ |

FIG. 7

IMPACT ASSESSMENT DB

| ITEM | IMPACT-COEFFICIENT |
|---|---|
| IRON | $\alpha$ \$/Kg |
| COPPER | $\beta$ \$/Kg |
| ⋮ | ⋮ |

METHOD AND SYSTEM FOR EVALUATING ENVIRONMENTAL IMPACT OCCURRING DURING AN ACTIVITY CYCLE

TECHNICAL FIELD

The present disclosure generally relates to a system and method for evaluating an environmental load caused by a given activity, and more particular to a system, method, and program for efficiently and effectively conducting a life cycle assessment of a given activity based on environmental load information.

BACKGROUND

Increased human activities (e.g., globally-operated business activities) may affect the environment on Earth. As a result, environmental issues/problems have appeared such as possible exhaustion of energy/resources and material recycling issues, for example.

With such social trends, business entities, which may operate business activities domestically or internationally, may need to recognize such environmental issues as important issues to sustain business activities, and may need to take measures to cope with such environmental issues.

With such background, a number of organizations or entities in the public sector (e.g., governmental organizations) or the private sector (e.g., industries) have developed or are developing methods for evaluating environmental impact caused by activities such as business activity (e.g., product manufacturing).

For example, business entities belonging to manufacturing industries may use an LCA (Life cycle Assessment) method to evaluate or assess the impact of business activity on the environment. Such manufacturing business entities may use an LCA method to evaluate or assess the environmental load caused by product manufacturing, for example.

The LCA method may quantitatively evaluate the environmental performance of a finished product in its life cycle using objective criteria, indicating environmental loads, which may occur during the life cycle of the finished product.

In general, a product life cycle may include a number of stages, which may start from a material mining stage to a product discarding stage. In other words, the product life cycle may include the stages of a product "from cradle to grave."

With such background, it has been desired to devise a method which can more precisely evaluate or assess the environmental impact or load caused by business activities (e.g., product manufacturing).

From the viewpoint of a manufacturer producing a variety of products, a product life cycle may include multiple stages such as "front-end stage," "manufacturing stage," "distribution/sales stage," "use stage," "repair/maintenance stage," "recovery/recycle stage," and "discarding stage," for example. The "front-end stage" may mean a stage for obtaining raw materials, parts or the like to be used for the "manufacturing stage."

When a manufacturer conducts an LCA process for a product produced with the above-mentioned stages, the manufacturer may need to collect information regarding the environmental load which may occur at each of the above-mentioned stages.

To ideally conduct such an LCA process, it may be necessary to initially collect factual information on the environmental load of each material and part, which may be used at each of the above-mentioned stages. In other words, factual information on the environmental load of each material and part may need to be collected without missing required factual information.

In general, an LCA process can be conducted more precisely by collecting more precisely prepared factual information on environmental load.

In view of such background, several organizations in the public sector (e.g., governmental organizations) or the private sector (e.g., industries) have been developing and releasing databases listing the environmental load caused by material and parts as reference data. For example, such databases may generally be referred to as "LCI (Life cycle Inventory) data."

Such LCI data may include data for environmental load, which may be caused by using materials and resources for human activities such as business activities.

In general, such LCI data for material or resources may be measured on a "per unit" basis. The "per unit" may mean a particular amount of a particular material or resource to be used for making a particular amount of a part or product. In other words, such LCI data for material or resource may mean the "input amount" of a material or resource for producing a particular amount of a part or product. In general, the particular amount of a part or product may mean a single unit of a part or product.

Hereinafter, the term "LCI data" having the above-mentioned meaning may be used for indicating an environmental load on a material, resource, part, product or the like.

Such LCI data may be classified on an item-by-item basis, wherein such item may include a vast variety of materials, resources or the like, such as metals (e.g., copper), biological resources (e.g., woods for making paper), energy recourses (e.g., petroleum), emission material (e.g., carbon dioxide, nitride oxide), or socially important resources (e.g., fresh water, electricity, gas), for example.

Each item identified as LCI data may have a numerical value to indicate the environmental load associated with each item, wherein such numerical value may indicate an environmental load that may occur when such item is used for manufacturing a part or product.

With such databases developed and released by several organizations, a business entity can obtain reference indicators (i.e., LCI data) for the environmental load for a number of materials and parts, which may be used by the business entity.

Such databases including LCI data may be useful for a business entity (e.g., a manufacturer) for evaluating the environmental load for materials, parts, or the like purchased from a third party company, because the business entity (e.g., a manufacturer) can obtain environmental load information for such purchased materials and parts by referring to the above-mentioned databases.

Such databases including LCI data for materials and parts may facilitate an environmental load evaluation by a business entity (e.g., a manufacturer) because the business entity can obtain such LCI data at an upstream stage of production, such as the procurement stage, for example.

If the business entity can obtain LCI data for materials, resources, and parts or the like, to be used for product manufacturing, at an upstream stage of production (e.g., the procurement stage), the manufacturer can then evaluate the environmental load of a to-be-produced product before such product is actually produced.

In such situation, the business entity (e.g., the manufacturer) can change or select materials, resources, and parts or the like to be used for a product by reviewing the result of an environmental load evaluation or assessment of the product.

Such process may be favorable from the viewpoint of producing an environmentally-concerned product because the business entity (e.g., the manufacturer) can foresee a possible environmental load of one product before actually producing the product, and then the business entity (e.g., the manufacturer) can select materials, resources, and parts or the like, which may have a smaller environmental load compared to the ones originally assigned for the product.

Furthermore, the business entity (e.g., the manufacturer) can conduct an LCA process at a design/plan stage of product manufacturing, which is another stage in the upstream stage of product manufacturing.

For example, a designer/engineer may select materials and parts to be used for producing a product, and then the designer/engineer can conduct an LCA process for a product to-be-produced based on such selected materials and parts.

Accordingly, if the above-mentioned databases including LCI data are publicly available, a business entity can obtain information on the environmental load caused by materials and parts at the upstream stage of business activities (e.g., product manufacturing), such as the design/plan stage or the procurement stage.

On one hand, a business entity can obtain information on the environmental load caused by materials and parts used in a finished product by analyzing each component configuring the finished product one-by-one. In such case, the materials and parts used for the finished product may be identified step-by-step by breaking down the components of the finished product, and then the environmental load of the materials and parts may be determined. However, such deconstruction process may be time-consuming and inefficient.

Accordingly, obtaining environmental load information such as LCI data at an upstream stage (e.g., at the design/plan stage) of business activities (e.g., product manufacturing) may be preferable from a viewpoint of conducting an LCA process more efficiently and effectively.

In view of such background, a system or method for conducting a LCA process on a given activity has been developed in recent years.

For example, in a related art a design-aide system may be used for product design in which the design-aide system may have a database for conducting an LCA process for product manufacturing. Such database may store LCI data and category information of materials and parts to be used for a product.

Such design-aide system may include a CAD (computer-aided design) system having a screen, by which a designer can designate or select materials and parts used for a product.

The design-aide system may then search designated materials and parts in the database to specify category information of the designated materials and parts.

Then, the design-aide system may further specify LCI data corresponding to the specified category information of the designated materials and parts to obtain the LCI data for the designated materials and parts.

As such, the design-aide system may obtain LCI data (or environmental load information) related to a product at an upstream stage (e.g., the design/plan stage), and then transmit such obtained LCI data to a LCA analyzing unit via a network such as a LAN (Local Area Network) and the Internet, for example.

For example, the LCA analyzing unit may receive such LCI data from a plurality of design-aide devices (e.g., CAD terminals) connected to the LCA analyzing unit, and conduct an LCA analysis using such information transmitted from the plurality of design-aide devices (e.g., CAD terminals).

Hereinafter, two types of environment impact evaluation methods based on the concept of LCA are briefly explained with reference to FIG. 1.

FIG. 1 shows examples of two types of environment impact evaluation methods: 1) issue comparing type method, and 2) damage assessment type method.

The "issue comparing type method" may have been used for a relatively long time, and the "damage assessment type method" may have been developed more recently, and these two types may have some differences as indicated below.

In the case of the issue comparing type method, an LCI (life cycle inventory) analysis may be conducted mainly for evaluating the impact of each material or resource on the natural environment.

For example, as partly shown in FIG. 1, the issue comparing type method may mainly evaluate a number of evaluation items one-by-one to assess the environmental impact of each item on the natural environment. For example, such items may include a material consumption amount (e.g., an amount of iron ore), and an amount of emission gas such as carbon dioxide ($CO_2$), nitrogen oxide (NOx), and sulfur oxide (SOx), which may be generated when producing, using, and discarding a product in its one life cycle.

In such issue comparing type method, an amount of material to be used for a business activity (e.g., product manufacturing) or an amount of material to be released to the environment may be assessed item-by-item. For example, an amount of emission gas such as carbon dioxide ($CO_2$), nitrogen oxide (NOx), and sulfur oxide (SOx), may be assessed one-by-one.

Based on such an analysis, assessing the environmental load in terms of the amount of material to-be-used or released, a business entity may recognize the environmental impact of its business activity and may make a new environmental management decision so that the business entity may conduct more environmentally sound operations.

Such issue comparing type method may be convenient for evaluating or assessing the environmental load of each item such as carbon dioxide ($CO_2$), nitrogen oxide (NOx), and sulfur oxide (SOx).

However, the above-explained issue comparing type method may not be so effective to precisely evaluate or assess the overall environmental impact of a product in its life cycle, because the issue comparing type method may mainly evaluate or assess the environmental impact of each item one-by-one, and may not evaluate or assess the overall combined environmental impact of each item.

Furthermore, the above-explained issue comparing type method may mainly evaluate or assess the environmental load of each item with a numerical value expressed in terms of the "material amount to be used" or "used material amount."

Accordingly, a user (e.g., a business entity) of such evaluation data may find it difficult to recognize the type or level of environmental impact that will occur by using a given amount of a material for a business activity (e.g. one product life cycle).

In view of such situations, the "damage assessment type method" may have been developed recently as shown for example in FIG. 1.

Although the damage assessment type method may also use LCI data (as in the issue comparing type method), the damage assessment type method may try to evaluate or assess the broader environmental impact caused by using a given amount of material for business activities (e.g., one product life cycle).

One example of such damage assessment type method is explained hereinafter.

For example, in Japan, a LIME (life cycle impact assessment method based on endpoint modeling) method has been developed to evaluate the environmental impact to be caused during one product life cycle.

The LIME method may evaluate the environmental impact during one product life cycle by computing the damage caused to the environment during the one product life cycle.

Specifically, the LIME method may conduct the following steps for evaluating environmental impact to be caused during one product life cycle: fate analysis, exposure analysis, damage assessment, effect analysis, and weighting process.

In the fate analysis, the concentration change of substances having a given environmental load in an environmental medium (e.g., atmosphere, water) is analyzed. Such concentration change may lead to a change in the exposure amount of substances to a biological receptor (e.g., human, animal, plant).

In the exposure analysis, a change of the exposure amount of substances to a biological receptor (e.g., human, animal, plant) is analyzed based on the fate analysis.

In the damage assessment, a change of possibly-occurring damage to the biological receptor (e.g., human, animal, plant) due to an increase of exposure amount of substances may be assessed, for example.

In the effect analysis, each of the possibly-occurring damage is accumulated for each endpoint (e.g., human health).

The endpoint may include various types of elements in the environment (e.g., the human environment and natural environment), which may be affected by using a given amount of material for one product life cycle.

For example, as shown in FIG. 1, an environmental impact of some metals such as copper may be explained as below. When a given amount of copper ore is mined at a mining site, a given amount of copper metal may be removed from the soil. Because the amount of copper contained in the earth's soil may be limited, if such mining operation is repeated, it may end up mining all of the copper from the earth's soil in a given time period. Such a case may be related to an endpoint termed the "social infrastructure" because a mining site may be considered to be an infrastructure required for maintaining human society.

Then, a possibly-occurring damage to the "social infrastructure" may be evaluated or assessed. For example, such evaluation or assessment of possibly-occurring damage to the "social infrastructure" may be considered in terms of infrastructure maintaining costs, infrastructure repairing costs, or the like.

In the weighting process, the priority levels of different kinds of endpoints related to one product life cycle may be considered to compute an overall environmental impact during one product life cycle, wherein such overall environmental impact may be expressed as a damage cost to the overall environmental.

In general, such damage cost may be measured in terms of money value so that a user (e.g., a business entity) can evaluate or assess the impact of one activity (e.g., product manufacturing) more clearly.

For example, the damage cost may include a repairing cost or a required countermeasure cost (e.g., the cost of medical care if human health is damaged), but the damage cost is not limited solely to such costs.

The above-mentioned evaluation or assessment methods employing LCA may be conducted with a framework as shown, for example, in FIG. 2.

As shown in FIG. 2, the LCA framework may include step S1 for setting an object and scope, step S2 for inventory analysis (e.g., LCI data analysis), step S3 for impact evaluation, step S4 for result interpretation, step S5 for reporting, and step S6 for critical review, for example. Furthermore, the reporting at step S5 may be used for applications at step S7, such as product development as shown in FIG. 2.

However, although the above-explained issue comparing type method and damage assessment type method may have a common objective to evaluate or assess the environmental impact of activities (e.g., business activities), the issue comparing type method and the damage assessment type method may have a different view of LCI data.

For example, the issue comparing type method and the damage assessment type method may have a different view of inventories (e.g., LCI data) to be used for the environmental evaluation. For example, in regard to metal resources, the damage assessment type method such as LIME may assess the weight of the true metal elements, and not the amount of mineral ore of the concerned metal. However, the issue comparing type method may assess the weight of ore content.

Such differences may lead to a discrepancy of environmental impact evaluation results obtained by each of the two methods, and such situation may be inconvenient for a user (e.g., a business entity) that needs environmental impact evaluation information matched to an actual business operation conducted by the user.

FIG. 3 schematically shows an example of such inconvenience due to different views of LCI data between the issue comparing type method and damage assessment type method.

Hereinafter, a different view of LCI data, which may be observed between the issue comparing type method and the damage assessment type method, may be explained using as an example the "resource exhaustion" of copper metal.

In general, a data provider (e.g., a mining company, a manufacturing company) may prepare conventional type LCI data for each item, such as the amount of copper ore to be used for a given part or product.

In general, a tracing back of the life cycle of each item (e.g., copper, copper ore) may require a tremendous amount of time and complex steps, which may not be tolerable for the data provider. In view of such situation, the data provider may prepare conventional type LCI data for materials (e.g., raw material such mineral ore) to be input into a given manufacturing stage, which may be controllable by the data provider (e.g., mining company, manufacturing company).

On one hand, in the damage assessment type method, an assessment method developer may need data of virgin materials (e.g., true copper metal) to be input into a given manufacturing stage for conducting an environmental impact evaluation for the "resource exhaustion" of metals such as copper.

Because of such situations, a user (e.g., business entity) may need to adjust the conventional type LCI data to a modified LCI data, matched to the damage assessment type, so that the user (e.g., business entity) can use such modified LCI data for evaluating the environmental impact of a given business activity.

Accordingly, a user (e.g., business entity) may need an efficient and effective system for conducting such modification or correction of the LCI data so that a user (e.g., business entity) can employ the above-mentioned issue comparing type method and damage assessment type method in a seamless manner.

SUMMARY

The present disclosure relates to a system for evaluating an environmental impact caused during one life cycle of a given activity. In one embodiment the system includes a controlling unit, which controls the system with a plurality of data storage elements connected to the controlling unit. The plurality of data storage elements includes a first data storage element, a second data storage element, and a third data storage element. The first data storage element stores a first data type for each item to be used for the given activity. The first data type includes life cycle inventory data associated with each item. The second data storage element stores a second data type for each item. The second data type includes grade information and recycle ratio information associated with each item. The third data storage element stores a third data type for each item, the third data type includes modified life cycle inventory data associated with each item. The third data type is obtained by modifying the first data type with the second data type. When the given activity includes a production of one unit of product from a given item including a virgin material and a recycled material, the controlling unit computes a gross amount of the virgin material to be used for producing the one unit of product by referring a first data type for the given item. The gross amount of the virgin material is adjusted with an amount of the recycled material determined based on a recycle ratio information related to the given item. The controlling unit computes a substantially true amount of the virgin material to be used for producing the one unit of product by modifying the gross amount of the virgin material with grade information related to the given item. The controlling unit stores the substantially true amount of the virgin material to the third data storage element as the third data type. The plurality of data storage elements further includes a fourth data storage element configured to store an impact-coefficient data for each item. The controlling unit prepares a first analysis result having an environmental load caused by each item by listing the substantially true amount of the virgin material of each item to be used for producing the one unit of product. The controlling unit prepares a second analysis result having an environmental impact evaluation of one life cycle of the product by multiplying the substantially true amount of the virgin material of each item with the impact-coefficient data for each corresponding item. The controlling unit outputs the first analysis result and the second analysis result.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 shows a schematic diagram explaining an evaluation system according to an exemplary embodiment;

FIG. 5 shows an example of a schematic data format stored in an inventory DB (database);

FIG. 6 shows an example of a schematic data format stored in a corrected inventory DB (database);

FIG. 7 shows an example of a schematic data format stored in an impact evaluation DB (database);

Figure 1:
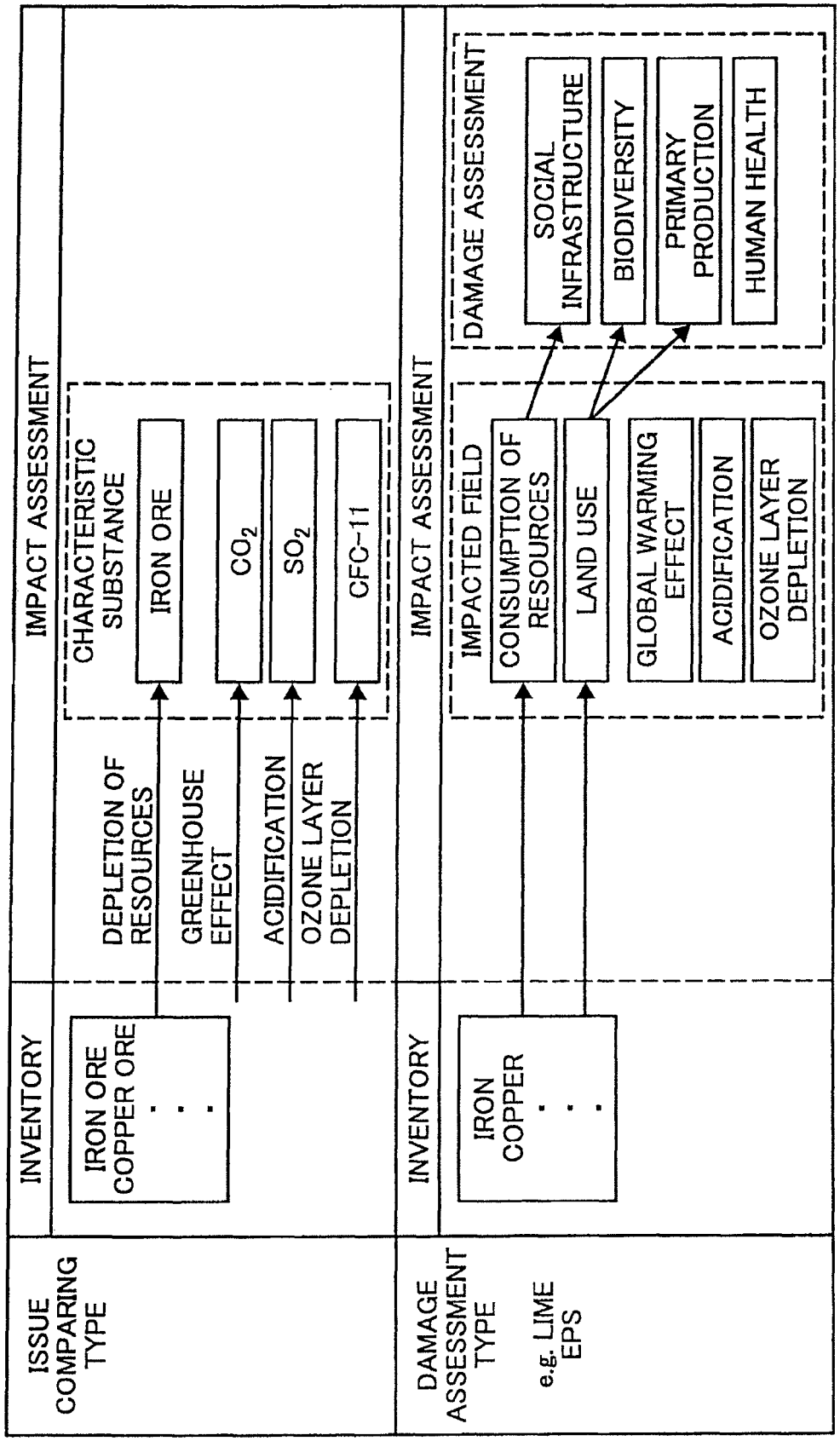
FIG. 1 shows examples of two types of environmental impact evaluation methods—an issue comparing type method and a damage assessment type method.

The accompanying drawings are intended to depict exemplary embodiments of the present invention and should not be interpreted to limit the scope thereof. The accompanying drawings are not to be considered as drawn to scale unless explicitly noted.

DETAILED DESCRIPTION OF EXEMPLARY EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present.

Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, a system or method of evaluating an environmental impact, to be caused during one life cycle of a given activity, according to an exemplary embodiment is described with particular reference to FIG. 4.

In an exemplary embodiment, an evaluation unit 20 shown in FIG. 4 may conduct an LCA (life cycle assessment) process for a given activity conducted by a business entity (e.g., manufacturer).

As shown in FIG. 4, the evaluation unit 20 may be configured as a system for evaluating an environmental impact to be caused by a given activity conducted by a business entity.

For example, the evaluation unit 20 may conduct a LCA process for one product to be manufactured by a business entity.

When conducting the LCA process for one product, the evaluation unit 20 may obtain environmental load information at each stage in one life cycle of the product to compute an environmental impact, which may occur in one life cycle of the product, and evaluate or assess the environmental impact caused by one life cycle of the product.

For example, a one product life cycle may include a plurality of stages such as "front-end stage," "manufacturing stage," "distribution/sales stage," "use stage," "repair/maintenance stage," "recovery/recycle stage," and "discarding stage".

In this specification, "evaluate" and "assess" may be used as interchangeable term, and both terms may be used, as required. Similarly, "evaluation" and "assessment" may be used as interchangeable term, and both terms may be used, as required.

The evaluation unit 20 may conduct an LCA analysis at each stage, and may compute an overall environmental impact to be caused during one product life cycle using a result of the LCA analysis obtained at each stage.

In one example, a terminal apparatus for inputting material information for an LCA analysis may be provided at each business unit responsible for handling each corresponding stage for product manufacturing. In such a case, a user (e.g., engineer) in each business unit may input required information to the terminal apparatus.

Then, the input information may be transmitted to the evaluation unit 20 so that the evaluation unit 20 may conduct an overall LCA analysis for one life cycle of the product.

Such LCA analysis for one product life cycle may be conducted at any stage in one product life cycle such as "front-end stage," "manufacturing stage," "distribution/sales stage," "use stage," "repair/maintenance stage," "recovery/recycle stage," and "discarding stage," although it may be preferable to conduct such LCA analysis at an upstream stage of one product life cycle.

As shown in FIG. 4, the evaluation unit 20 may include a controlling unit 21.

Furthermore, the controlling unit 21 may be connected to an input unit 31 and an output unit 32, for example.

The controlling unit 21 may include a CPU (central processing unit) and a memory such as RAM (random access memory) and ROM (read only memory), for example, although not shown. The controlling unit 21 may control a plurality of process steps (to be described later) for evaluating an environmental impact to be caused by a given activity with a software program, which may be installed in the evaluation unit 20, for example.

The input unit 31 may include an inputting device such as a keyboard and pointing device, for example. A user (e.g., engineer) can input information to the controlling unit 21 with the input unit 31.

The output unit 32 may include an outputting device such as a display unit and printer, for example. The output unit 32 may output or display a result computed by the controlling unit 21, as required.

Furthermore, as shown in FIG. 4, the evaluation unit 20 may include an inventory DB (database) 22, additional information DB (database) 23, corrected inventory DB (database) 24, and impact evaluation DB (database) 26, for example.

The inventory DB 22 may function as a first data storage element, which may store LCI (life cycle inventory) data. Such LCI data may be available from several data providers.

Specifically, as shown in FIG. 5, the inventory DB 22 may store LCI data 220.

The LCI data 220 shown in FIG. 5 may include LCI data for various types of items, wherein the items may included materials, resources or the like such as mineral ore (e.g., iron ore, copper ore), biological resources (e.g., woods for paper), energy recourses (e.g., petroleum), emission material (e.g., carbon dioxide, nitride oxide), and socially served recourses (e.g., fresh water, electricity, gas), for example.

In case of metal item (e.g., copper), LCI data 220 may be prepared in view of the exhaustion probability of resources (e.g., copper ore), for example.

In an exemplary embodiment, a database including the LCI data 220 may be obtained from a third-party organization. For example, such database may be obtained from "LCA database of LCA Japan forum" and "JEMAI-LCA of JEMAI" (Japan environmental management association for industry).

Accordingly, in an exemplary embodiment, the inventory DB 22 may store the LCI data 220 obtained from an external organization, for example.

The LCI data 220 may include data related to an amount of material (e.g., iron ore, copper ore), which may be required for making a given amount of target material (e.g., iron ore for iron, copper ore for copper), for example.

As such, the LCI data 220 may include data for an item such as mineral ore (e.g., iron ore, copper ore) as shown in FIG. 5. Although not shown in FIG. 5, the LCI data 220 may include other items such as biological resources (e.g., woods for paper), energy recourses (e.g., petroleum), emission material (e.g., carbon dioxide, nitride oxide), and socially important resources (e.g., fresh water, electricity, gas), for example.

As shown in FIG. 5, such each item may include material name and an amount of material per unit basis, for example.

The material name corresponding to each item in the LCI data 220 may be used as identification information to specify types of materials, resources, energies, or the like.

The amount of material per unit basis may mean an amount of material required for manufacturing one unit of the part or product.

In this application, "part" and "product" may be interchangeably used. For example, if an electrical cable is made of copper alloy, the copper alloy may be a "part" and the electrical cable may be a "product." Furthermore, if the electrical cable is used in an electronic apparatus, the electrical cable may be a "part" and the electronic apparatus may be a "product," for example.

In this specification, the amount of material per unit basis for each item may be termed "LCI (life cycle inventory) data" for simplicity of expression.

Specifically, the amount of material per unit basis may be determined by each item, and stored as LCI data 220.

For example, FIG. 5 shows that the LCI data 220 may include an amount of resource (e.g., iron ore) to be consumed for producing a product in view of one life cycle. Although not shown in FIG. 5, the LCI data 220 may also include an amount of gas (e.g., $CO_2$ and $SO_x$) per unit basis, emitted during one life cycle of a product, for example.

Accordingly, the LCI data 220 may include a number of items and corresponding amount of item per unit basis, wherein such items may be used during one product life cycle.

Based on such LCI data 220, environmental load information for materials, resources or the like for one life cycle of a product may be obtained, and with accumulating environmental load information of each of materials, resources or the like, an environmental impact to be caused during one product life cycle may be obtained.

In the above-explanation, the inventory DB 22 may store the LCI data 220 obtained from a third-party organization such as a governmental organization.

In addition to such third-party organization, the inventory DB 22 may store the LCI data 220, which may be obtained from another database provider.

Such another database provider may include a business entity, manufacturing a concerned product, and a business entity, manufacturing parts or materials, for example, but not limited to such business entity.

The additional information DB 23 may function as second data storage element, and may store additional information data related to each item included in the LCI data 220.

Specifically, the additional information DB 23 may store additional information data 230 to be used for correcting or modifying the LCI data 220 stored in the inventory DB 22.

For example, the additional information data 230 may include "grade" information and "recycle ratio" information for each item included in the LCI data 220, as required.

The additional information data 230 may be obtained from a database provided by a third-party organization or the like, for example.

Specifically, in case of metal materials (e.g., iron, copper), the additional information DB 23 may store data related to "grade" information of mineral ore (e.g., iron ore, copper ore) and "recycle ratio" information of metal material (e.g., iron, copper) for items (e.g., iron ore, copper ore) included in the LCI data 220.

The additional information DB 23 may include such grade information and recycle ratio information for each item included in the LCI data 220, as required, as additional information data 230.

Such "recycle ratio" information for metal materials (e.g., iron, copper) may be used when making a metal product (as target product) from mineral ore (e.g., iron ore, copper ore) and recycled metal, for example. If the metal product (as target product) may be made partly from the recycled metal, an amount of mineral ore used for making the metal product (as target product) may be reduced.

For example, to be explained later with FIG. 9, assume a case that "electrolytic copper (i.e., metal product)" may be made from "scrap copper (i.e., recycled material)" and "copper concentrate (i.e., virgin material)."

The "copper concentrate (i.e., virgin material)" may be obtained by conducting a known refining step to copper ore (i.e., mineral ore).

Accordingly, if the "electrolytic copper (i.e., metal product)" may be made from "scrap copper (i.e., recycled material)" and "copper concentrate (i.e., virgin material)," an amount of "copper concentrate (i.e., virgin material)" for making "electrolytic copper (i.e., metal product)" can be reduced compared to a case that "electrolytic copper (i.e., metal product)" is totally made of "copper concentrate (i.e., virgin material)."

Furthermore, "copper concentrate (i.e., virgin material)" may include impurities therein, wherein the impurities may not be used for making a metal product (as target product).

Therefore, in order to precisely evaluate an impact of "copper" made from "copper concentrate (i.e., virgin material)," grade information of "copper concentrate (i.e., virgin material)" may be required.

The grade information of "copper concentrate" may mean a ratio of "copper" included in "copper concentrate (i.e., virgin material)."

Such grade information may be used to compute an amount of "copper" included in "copper concentrate (i.e., virgin material)."

Accordingly, an amount of "copper concentrate" before a modification by grade information may mean a gross amount of "copper concentrate" including impurities, and an amount of "copper concentrate" after a modification by grade information may mean a substantially true amount of "copper" in "copper concentrate."

Although a metal material (e.g., copper) is used for explaining grade information and recycle ratio information, other materials may similarly have grade information and recycle ratio information, as required. For example, recycle ratio information may be provided for resinous material made of petroleum because petroleum may be an exhaustible resource.

A recycling of material, resources, or the like may have become an important issue for a business entity, which may need a sustainable business operation.

For example, a business entity may need to watch following example conditions when to consider material usage: a material which may be more likely to be exhausted; a material having a volatility on its market price (e.g., a surge of price increase); and an input energy for obtaining a material.

For example, some industrial report may say that some metals such as gold may be exhausted within a certain period of times; some metals such as copper may have market price volatility due to economic expansions in some countries; and a recycling ratio of rare metals may have been increased because of input energy for making rare metals from mineral ores is so high (e.g., rare metal recovery from product has been increasing).

In view of such situation, a business entity may need the above-mentioned recycle ratio information for materials as additional information data so that the business entity can reduce a cost impact of materials to its business activities.

With such additional information data 230, the LCI data 220 may be modified or corrected to obtain corrected LCI data 240.

Then, the corrected LCI data 240 may be stored in the corrected inventory DB 24, which may function as third data storage element. As shown in FIG. 6, the corrected inventory DB 24 may store corrected LCI data 240.

The corrected LCI data 240 may be used for evaluating an environmental load of each item, and may also be used for evaluating an environmental impact of one life cycle of a given activity.

As shown in FIG. 6, the corrected LCI data 240 may include corrected LCI data for each time, wherein each time may include material name and corrected LCI data.

Each item in the corrected LCI data 240 may have a material name as identification information for identifying each item.

However, a material name for each item in the corrected LCI data 240 may different from a material name in the LCI data 220, stored in the inventory DB 22.

For example, the LCI data 220 may include an item having a name of "iron ore" as shown in FIG. 5.

After modifying or correcting LCI data for "iron ore" with additional information data such as grade or recycle ratio information, the corrected LCI data 240, corresponded to the LCI data 220 having a name of "iron ore," may have a name of "iron" as shown in FIG. 6.

As explained later, an item named as "iron" obtained with such correction process may be included in the impact evaluation DB 26.

Therefore, a name of each item in the corrected LCI data 240 and a name of corresponding each item in the impact evaluation DB 260 may have a same name (see FIGS. 6 and 7), wherein such name of each item may be used as identification information for identifying each item in the corrected LCI data 240 and the impact evaluation DB 260.

As above-mentioned, the amount of material per unit basis may mean an amount of material required for manufacturing one unit of part or product, and the amount of material per unit basis may be termed "LCI data" for the simplicity of expression.

As above described, the corrected LCI data 240 may be obtained by modifying or correcting the LCI data 220 using the above-explained additional information data (e.g., grade and recycle ratio information).

The impact evaluation DB 26 may function as fourth data storage element, and may store impact-coefficient data 260 as shown in FIG. 7.

Specifically, the impact-coefficient data 260 may be used for converting an environmental load (i.e., corrected LCI data) of each item, included in the corrected LCI data 240, into an environmental impact caused by each item.

Specifically, such environmental impact caused by each item may be expressed as damage cost or money value.

The impact-coefficient data 260 for each item may be determined by experts, who may have studied and researched environmental impact caused by each item, based on a number of factors such as market price of materials (e.g., ingots), for example.

The impact-coefficient data 260 may be used to converting an environmental load of each item into a damage cost, which is expressed in money value, so that a social cost associated for one product life cycle may be clearly presented to a user (e.g., business entity) or public.

If damage cost is expressed in money value, a social cost associated for one product life cycle may be more easily recognized compared to just showing an amount of material or resources to be used for one product life cycle.

In an exemplary embodiment, the impact-coefficient data 260 may be provided by a third-party organization.

For example, EPS (environment priority strategies for product design) Ver. 2000 for life-cycle impact assessment method, developed by Swedish Environmental Research Institute Ltd., may be used for obtaining the impact-coefficient data 260.

Hereinafter, a LCA process conducted by the evaluation unit 20 is explained with FIG. 8.

Figure 8:
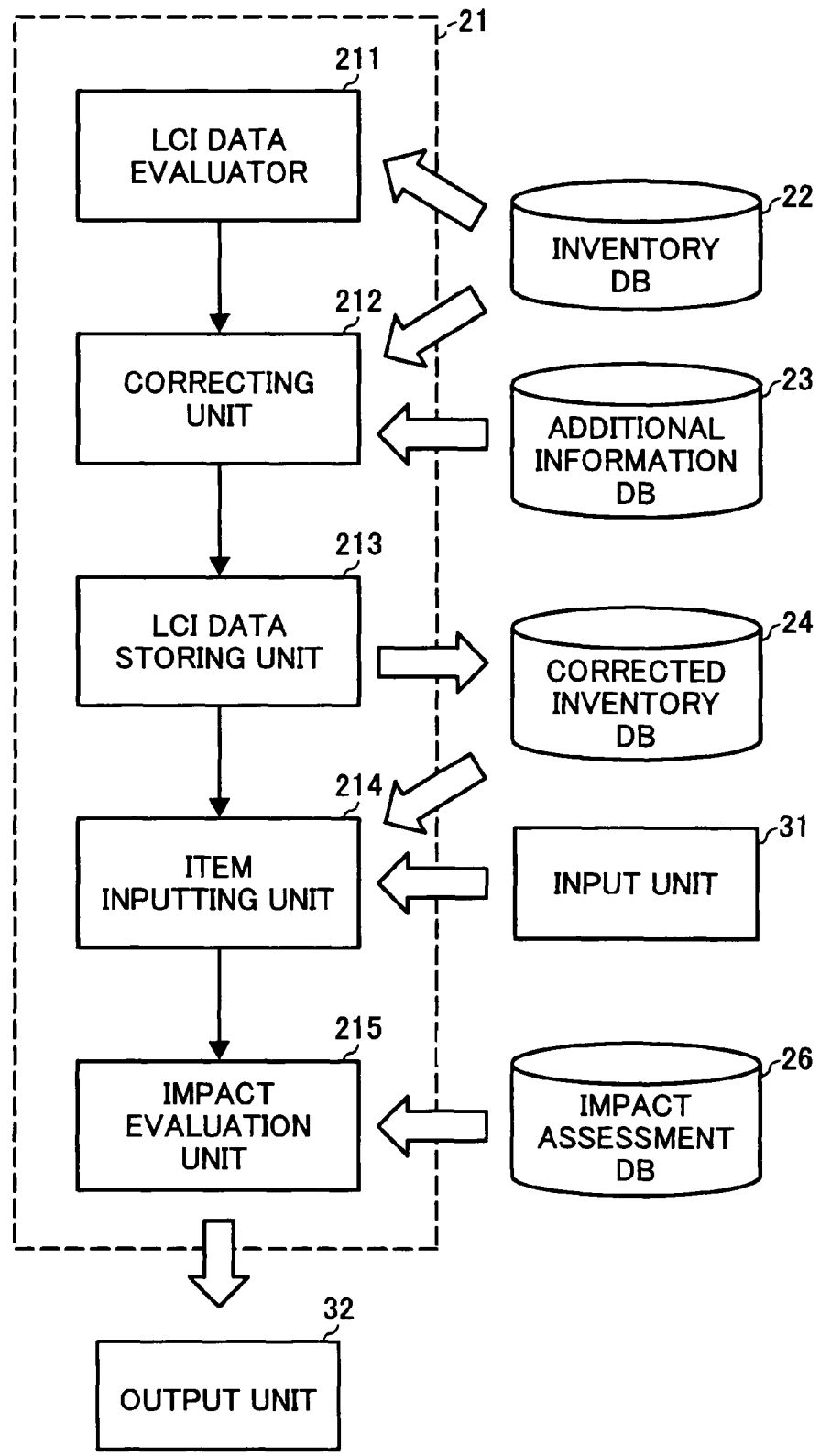
FIG. 8 shows a schematic diagram explaining each unit used for conducting data processing for an impact evaluation according to an exemplary embodiment.

As shown in FIG. 8, the controlling unit 21 may include a LCI data evaluator 211, a correcting unit 212, an LCI data storing unit 213, an item inputting unit 214, and an impact evaluation unit 215.

At first, the LCI data evaluator 211 may retrieve the LCI data 220 required for a LCA process for one part or product from the inventory DB 22.

Then, the correcting unit 212 may conduct a correction process to the LCI data 220, for which an additional information data 230 stored in the additional information DB 23 may be used.

Figure 9:
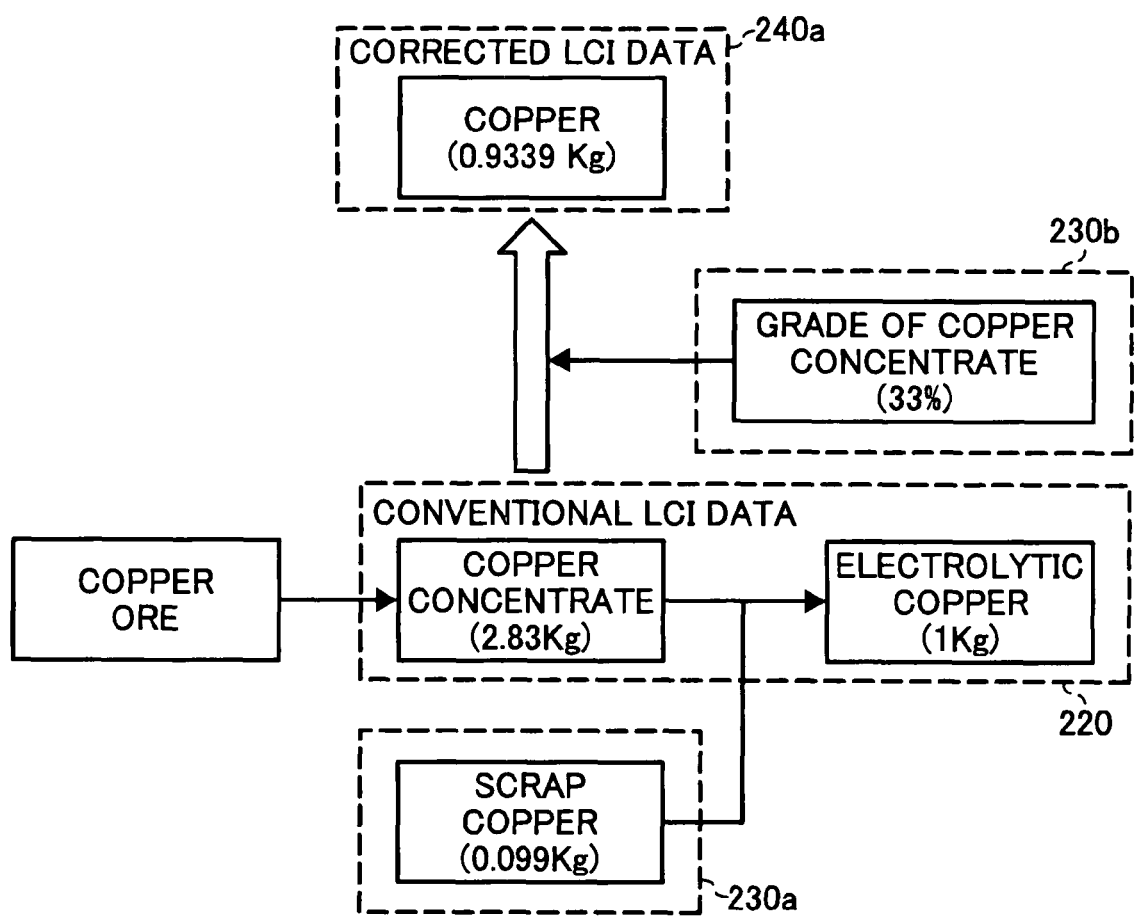
FIG. 9 shows a schematic example process for computing corrected LCI data according to an exemplary embodiment.

With reference to FIG. 9, a LCA process for making of "electrolytic copper" of 1 kg is explained as one example.

As shown in FIG. 9, "electrolytic copper" may be made of "copper concentrate (i.e., virgin material)" and "scrap copper (i.e., recycled material)", for example.

Specifically, by referring recycle ratio information for copper, included in the additional information data 230, "scrap copper" of 0.099 kg (data 230a in FIG. 9) may be specified for making "electrolytic copper" of 1 kg, for example.

Then, an amount of "copper concentrate" used for making "electrolytic copper" may be specified as below.

For example, the correcting unit 212 may retrieve a data of "copper concentrate (i.e., virgin material)" of 2.83 kg from the LCI data 220 stored in the inventory DB 22.

Then, the correcting unit 212 may specify grade information for "copper concentrate" of 2.83 kg by referring the additional information data 230.

For example, the correcting unit 212 may obtain "grade information" of 33% (i.e., data 230b in FIG. 9) by referring the additional information data 230 stored in the additional information DB 23.

Then, the correcting unit 212 may correct "copper concentrate (2.83 kg)" with "grade information (33%) (i.e., data 230b in FIG. 9)," in which copper concentrate" of 2.83 kg may be multiplied with the grade information of 33%.

Then, copper having a weight of 0.9339 kg (i.e., corrected LCI data 240a in FIG. 9) may be obtained by a calculation of "2.83 (kg)×0.33=0.9339 (kg)."

Then, as shown in FIG. 8, the LCI data storing unit 213 may store the corrected LCI data 240 to the corrected inventory DB 24, computed by the correcting unit 212.

In case of the above-explained example for "electrolytic copper" shown in FIG. 9, the data 240a (i.e., copper of 0.9339 kg) may be stored in the corrected LCI data 240.

Then, as shown in FIG. 8, the item inputting unit 214 may obtain an item, to be evaluated with LCA process. Specifically, a user may select or input an item name to the item inputting unit 214 via the input unit 31.

Then, the item inputting unit 214 may obtain the corrected LCI data 240 for the selected or input item (e.g., material) from the corrected inventory DB 24 to conduct an inventory analysis for the selected or input item.

Such inventory analysis may be conducted for each item to be used for one product life cycle, for example.

A result of inventory analysis may include each environmental load for each item.

For example, in case of the above-explained example for "electrolytic copper" shown in FIG. 9, the data 240a (i.e., copper of 0.9339 kg) may be specified as environmental load for copper, which may be used for one life cycle of electrolytic copper. Accordingly, the data 240a (i.e., copper of 0.9339 kg) may be listed as one time in an inventory analysis result, which may be prepared for one product life cycle (e.g., "electrolytic copper").

The data 240a (i.e., copper of 0.9339 kg) may correspond a true amount of virgin material to be used for one product life cycle (e.g., "electrolytic copper").

As such, the inventory analysis may be prepared by listing a true amount of virgin material for each item to be used for one life cycle of part or product, wherein such true amount of virgin material may be obtained by modifying a gross amount of virgin material with additional information such as grade information, which may be explained with an example case shown in FIG. 9.

Such inventory analysis for each item may list the corrected LCI data 240, obtained by modifying or correcting the LCI data 220 with the additional information data 230 stored in the additional information DB 230.

Then, the impact evaluation unit 215 may compute an impact evaluation result for one product life cycle.

Specifically, the impact evaluation unit 215 may retrieve the impact-coefficient data 260, from the impact evaluation DB 26, corresponding to the selected or input item, input by the item inputting unit 214 as above-mentioned.

Then, the impact evaluation unit 215 may multiply corrected LCI data 240 for the selected or input item with the impact-coefficient data 260 corresponding to the selected or input item.

With such computation, a damage cost to be caused by the selected or input item may be computed, wherein the damage cost may be expressed in money value as previously explained.

Because a product may generally contain a number of items, the above-described process shown in FIG. 8 may be conducted for a number of times by the controlling unit 21.

Then, the impact evaluation unit 215 may output an impact evaluation result of the selected or input item to the output unit 32.

If a product may be configured with one item, an impact evaluation result of one selected or input item may be used as an impact evaluation result of one product life cycle.

If a product may be configured with more than one item, a combined impact evaluation results of selected or input items may be used as an impact evaluation result of one product life cycle.

As above-described, in an exemplary embodiment, the additional information DB 23 may store the additional information data 230 for correcting the LCI data 220, stored in the inventory DB 22.

Specifically, the additional information DB 23 may store data related to "grade" information of and "recycle ratio" information for each item such as mineral ore, metal, for example.

With such "grade" information and "recycle ratio" information data, the corrected LCI data 240 reflecting material grade and material recycle ratio can be generated, and such corrected LCI data 240 can be used for LCIA (life cycle impact assessment) method.

As above-described, in an exemplary embodiment, the corrected LCI data 240 may be stored in the corrected inventory DB 24.

Each item name included in the corrected LCI data 240 may be used as identification information for identifying the item, and same item name may be used for each item included in the impact-coefficient data 260, stored in the impact evaluation DB 26.

With such impact-coefficient data 260, an environmental impact evaluation for one product life cycle can be conducted efficiently and effectively with LCIA (life cycle impact assessment) method.

Figure 10:
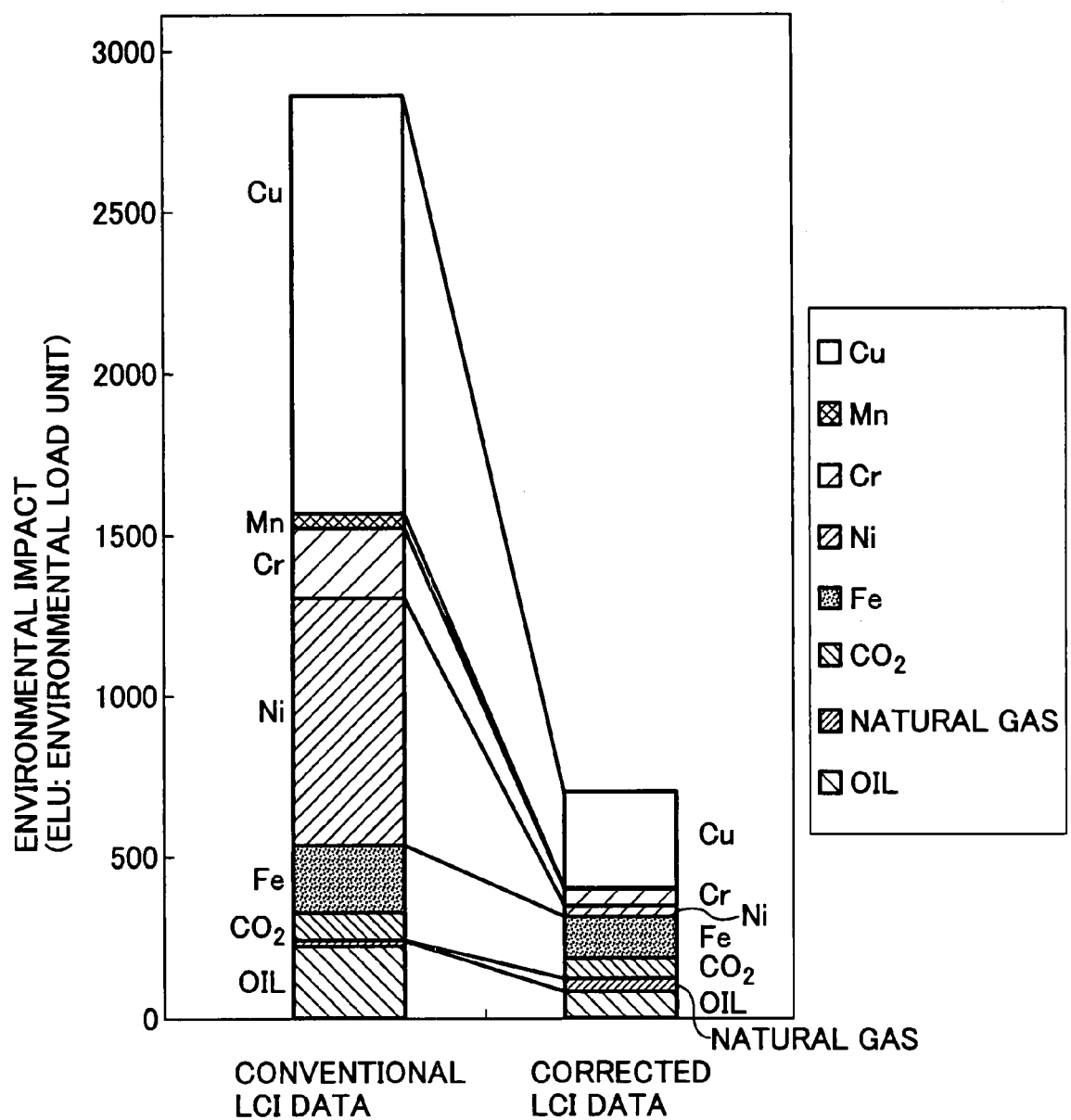
FIG. 10 shows an example graph comparing environmental impact results computed by a conventional method and a method according to an exemplary embodiment.

FIG. 10 shows one example comparing two environmental impact evaluations for an electronic apparatus using a LCIA (life cycle impact assessment) method, in which one case was evaluated with conventional LCI data and another case was evaluated by corrected LCI data obtained by a method according to an exemplary embodiment.

As shown in FIG. 10, a greater difference may be observed between the two cases.

Because the impact evaluation result for one product life cycle may be greatly changed by modifying or correcting LCI data for each item as shown in FIG. 10, a business entity may need to recognize characteristic of LCI data so that the business entity can evaluate an environmental impact for one product life cycle more precisely. For example, if such impact evaluation may be conducted with LCI data, which may not reflect an actual condition in industry environment, a business entity may end up of preparing an a kind of false impact evaluation result and may make a wrong decision based on such false impact evaluation result.

Figure 11:
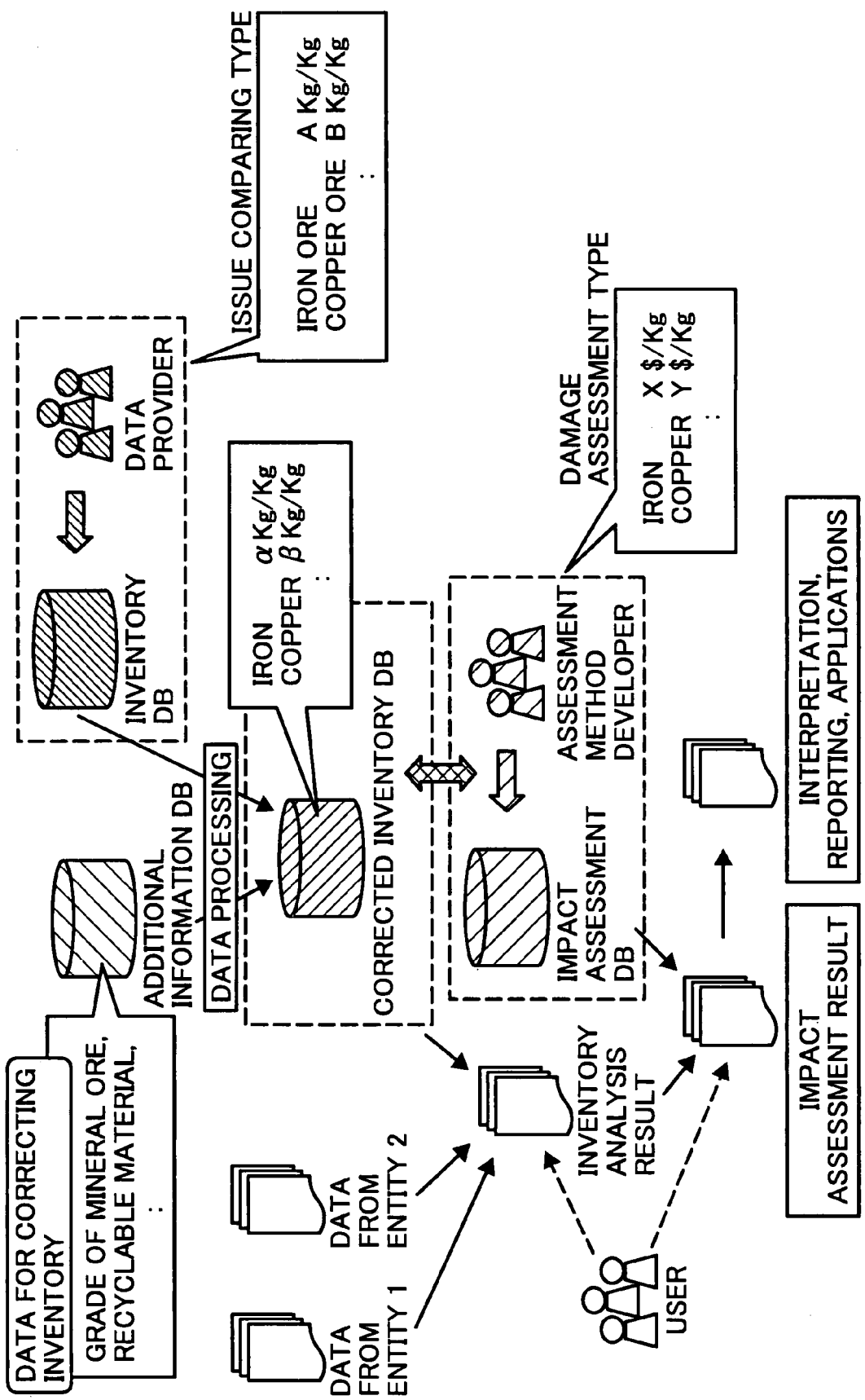
FIG. 11 shows an example scheme of a method of evaluating an environmental impact of a given activity using a system according to an exemplary embodiment.

FIG. 11 shows an example scheme of a method of evaluating an environmental impact of a given activity using the above-described system or method according to an exemplary embodiment.

Figure 2:
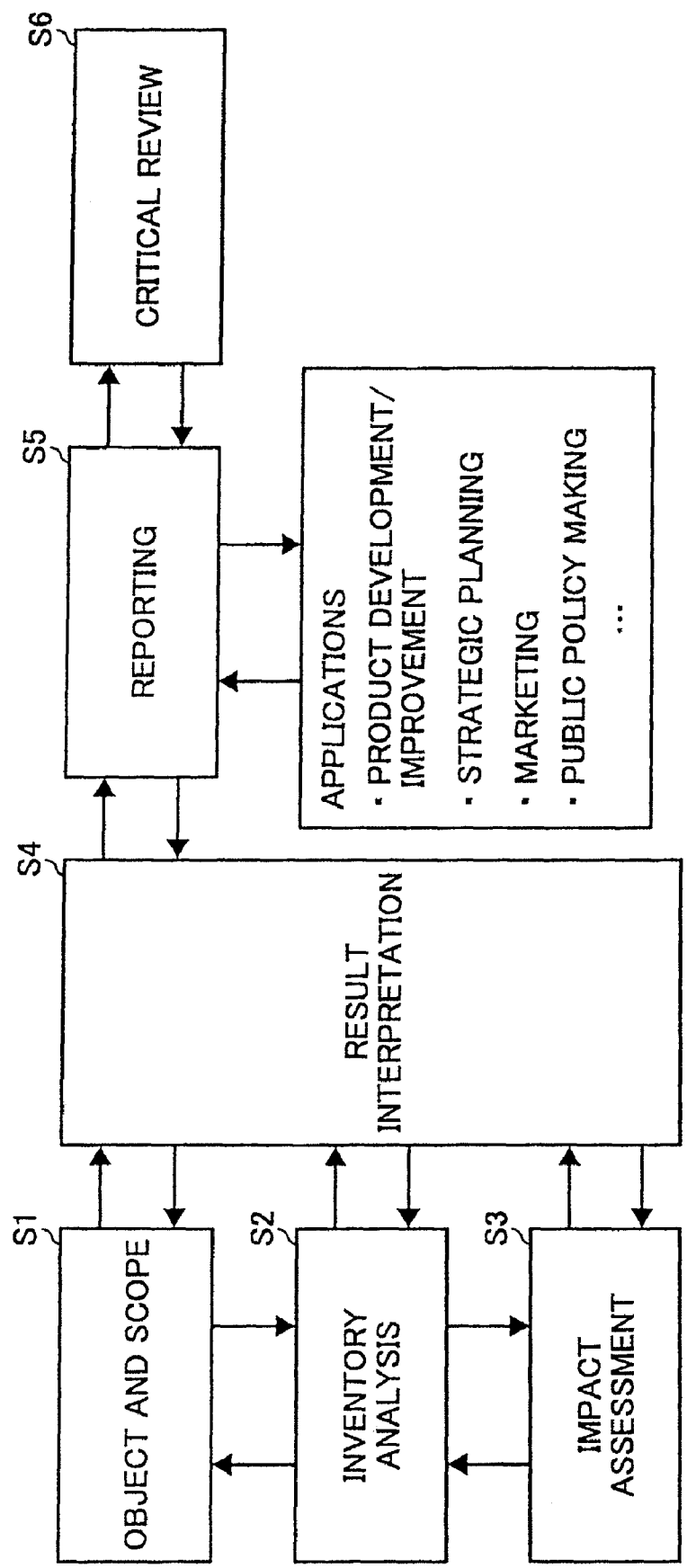
FIG. 2 is a schematic diagram explaining an example of a framework for an LCA process.
Figure 3:
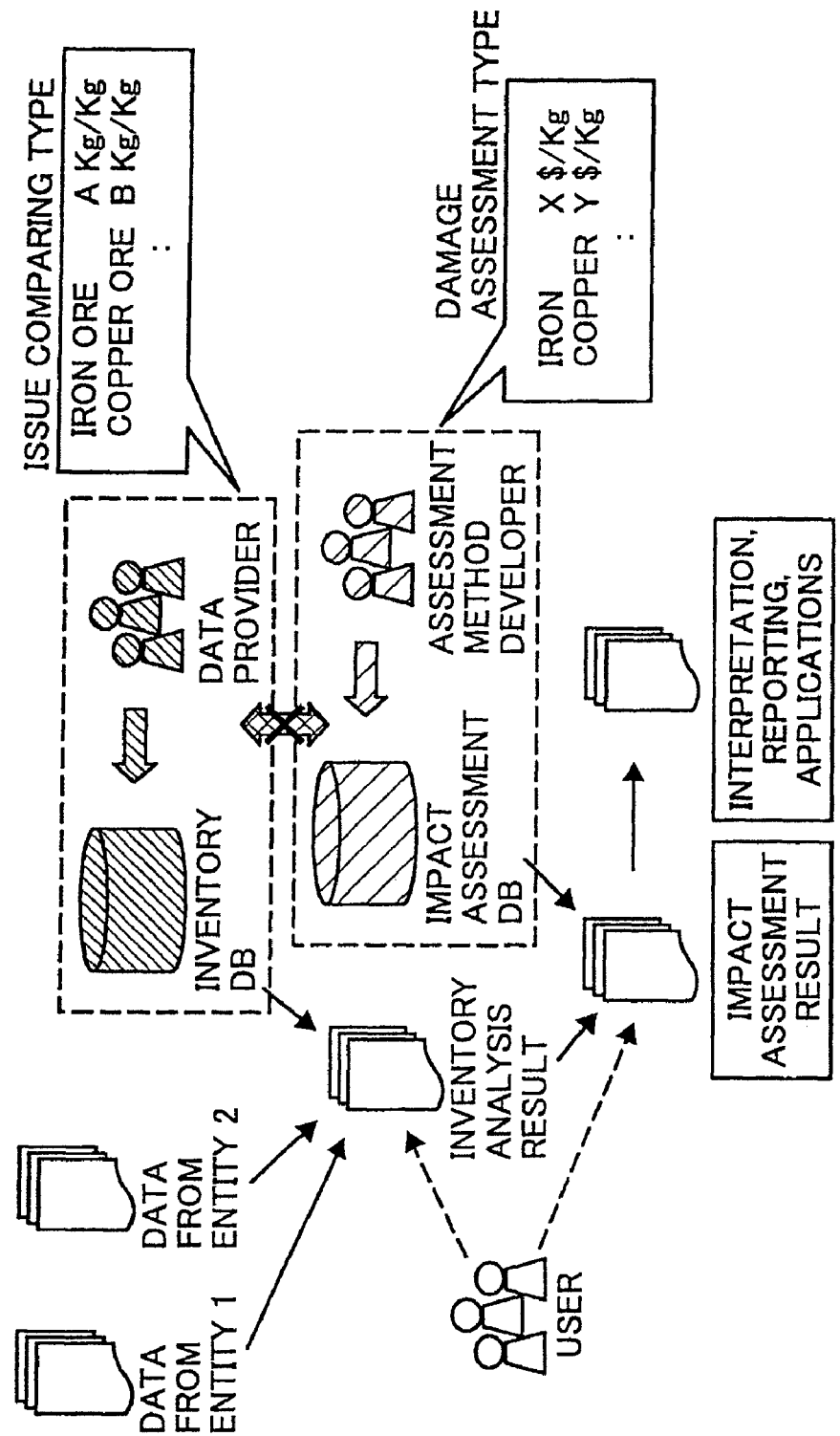
FIG. 3 schematically shows an example of an inconvenient situation between an issue comparing type method and a damage assessment type method.

When comparing an example scheme in FIG. 11 with a conventional scheme in FIG. 2, a user (e.g., business entity) may efficiently and effectively evaluate or assess an environmental impact of a given activity with an example scheme in FIG. 11 according to an exemplary embodiment because the corrected LCI data may be generated efficiently in an example scheme in FIG. 11.

As above-described, in an exemplary embodiment, the item inputting unit 214 may obtain an item to be evaluated with LCA process.

When to input an information item with the item inputting unit 214, a designer/engineer can select a part to be used for a product from a screen of a CAD machine while conducting a product designing work. Based on such selected part, a LCA process may be conducted for the selected part.

In such case, a part-data DB storing LCI data for each part may be provided to the CAD machine. Accordingly, information on environmental load of selected part can be obtained at the design/plan stage from such part-data DB, for example.

Accordingly, information on environmental load for each part can be obtained effectively and easily at an upstream stage (e.g., design stage, procurement stage). As a result, a more precise LCA process can be conducted at an upstream stage of one product life cycle.

In such part selecting process, a designer/engineer can conduct a LCA process for a product while conducting a usual product designing work with a CAD machine without learning a new procedure for handling LCI data for each item. Furthermore, the designer/engineer can conduct a LCA process without having a skilled staff for handling LCI data for each item.

Accordingly, without increasing process steps and staff for LCA process, a user (e.g., business entity) may efficiently conduct a LCA process for one product life cycle.

In the above-described exemplary embodiment, the evaluation unit 20, inventory DB 22, additional information DB 23, corrected inventory DB 24, and impact evaluation DB 26 may be provided as an integrated unit.

However, the inventory DB 22, additional information DB 23, and impact evaluation DB 26 may be located separately from the evaluation unit 20.

For example, the inventory DB 22, additional information DB 23, and impact evaluation DB 26 may be placed in a separate external place, and connected to the evaluation unit 20 via a communication network such as Internet or LAN (local area network).

In this case, the evaluation unit 20 may obtain required data from such externally placed database via the communication network such as Internet or LAN (local area network).

In the above-described exemplary embodiment, the evaluation unit 20 may include the controlling unit 21, input unit 31, and output unit 32.

Instead of such configuration, the evaluation unit 20 may be used as a server, and the input unit 31 and output unit 32 may be separated from the evaluation unit 20.

In such case, the input unit 31 and output unit 32 may be connected to the evaluation unit 20 via a network such as Internet or LAN (local area network), for example.

In this case, a user (e.g., engineer) may select or input an information item from a client terminal apparatus (i.e., input unit 31) and transmit the information to the evaluation unit 20 via the network such as Internet or LAN (local area network), for example.

Then, when the evaluation unit 20 may compute environmental load for such selected or input information item, the evaluation unit 20 may transmit and display such environmental load for such selected input information item to a terminal apparatus (i.e., output unit 32).

Such configuration may be preferable because a plurality of users (e.g., engineer) can share one unit of evaluation unit 20 and each database (e.g., inventory DB 22, additional information DB 23, corrected inventory DB 24, and impact evaluation DB 26).

In the above-described exemplary embodiment, the LCI data 220 stored in the inventory DB 22, additional information data 230 stored in the additional information DB 23, and impact-coefficient data 260 stored in the impact evaluation DB 26 may be released from a third-party organization.

In the above-described exemplary embodiment, the evaluation unit 20 may include a function for updating data status stored in inventory DB 22, additional information DB 23, and impact evaluation DB 26 to up-to-date condition.

For example, the controlling unit 21 may be configured to periodically monitor publicly-available database (including LCI data, additional information data, and impact-coefficient data), which may be released on a network such as Internet, to update data status of database (e.g., inventory DB 22, additional information DB 23, and impact evaluation DB 26).

With such configuration, information stored in database (e.g., inventory DB 22, additional information DB 23, and impact evaluation DB 26) may be updated and maintained to up-to-date condition, which is preferable for a user (e.g., business entity) that need up-to-date data for evaluating an environmental impact of a given activity more precisely.

For example, material recycle ratio may change depending on recycling trend in society and recycling technology, and impact-coefficient data used for computing damage cost may also change over time due to factors such as technology advancement and market price change of each item.

Based on such database, maintained at up-to-date condition and storing history information related to a given activity, information on environmental load for each item from past to present can be efficiently obtained and maintained.

Furthermore, some LCIA (life cycle impact assessment) methods such as EPS (environment priority strategies for product design), developed in Sweden, and LIME (life cycle impact assessment method based on endpoint modeling), developed in Japan may be effectively used with the above-mentioned evaluation method according to an exemplary embodiment.

For example, such LCIA method may include an exhaustible coefficient prepared for each of metal resources, wherein the exhaustible coefficient may mean an urgency of metal resource exhaustion.

Such exhaustible coefficient may be multiplied to an amount of true metal, which may be input to a product manufacturing, wherein such amount of true metal may be obtained by applying additional information (e.g., grade information of mineral ore, metal recycle ratio) to a given conventional LCI data using the above-described system or method according to an exemplary embodiment.

With such multiplication of exhaustible coefficient and the amount of true metal, an environmental impact of metal may be obtained.

Accordingly, a user (e.g., business entity) may efficiently and effectively obtain a result of environmental impact, which may be caused by a given business activity using such LCIA method, corrected LCI data, and the above-described system according to an exemplary embodiment.

In addition to the above-described product-based evaluation, the LCA method may be used to evaluate environmental impact or load, which may occur in a course of business activities conducted by one business entity, for example. In this case, a variety of elements such as office buildings, factories, and other business related elements might be considered to evaluate environmental impact or load, which may occur in a course of business activities conducted by one business entity.

Furthermore, the above-described evaluation process according to an exemplary embodiment may be conducted with a software program, which may be prepared according to an exemplary embodiment.

Numerous additional modifications and variations are possible in light of the above teachings. It is therefore to be understood that within the scope of the appended claims, the disclosure of the present invention may be practiced otherwise than as specifically described herein.

This application claims priority from Japanese patent application No. 2006-032804 filed on Feb. 9, 2006 in the Japan Patent Office, the entire contents of which is hereby incorporated by reference herein.

What is claimed is:

1. A system for evaluating environmental impact associated with an activity, the activity comprising production of a unit of a product from an item comprising virgin material and recycled material, the system comprising:
a controller,
a plurality of data storages associated with the controller, the plurality of data storages comprising:
a first data storage as an inventory database configured to store a first data type associated with the item, the first data type comprising life cycle inventory data associated with the item,
a second data storage as an additional information database configured to store a second data type associated with the item, the second data type comprising grade information and recycle ratio information associated with the item, and
a third data storage as a corrected inventory database configured to store a third data type associated with the item, the third data type comprising modified life cycle inventory data associated with the item,
the controller being configured to compute a gross amount of virgin material for producing the unit by referring to the first data type, multiply the gross amount of virgin material by an amount of recycled material determined based on the recycle ratio information associated with the item, compute a true amount of virgin material for producing the unit by multiplying the gross amount of virgin material with grade information associated with the item, and store the true amount of virgin material in the third data storage as the third data type, wherein the controller comprises a data evaluator, a correcting unit, a data storing unit, an item inputting unit and an impact evaluation unit and wherein the data evaluator is configured to retrieve the first data type from the first data storage, the correcting unit is configured to multiply the first data type into the third data type by applying the second data type, the data storing unit is configured to store the third data type in the third data storage, and wherein the item inputting unit receives an item designator and the third data type corresponding to the item designator, and the impact evaluation unit retrieves impact-coefficient data for the item designator from a fourth data storage, and multiplies the third data type with the impact-coefficient data.

2. The system of claim 1 wherein the plurality of data storages comprises the fourth data storage as an impact assessment database configured to store the impact-coefficient data associated with the item, the controller being configured to provide a first analysis result associated with an environmental load caused by the item by listing the true amount of the virgin material of the item, and to provide a second analysis result associated with an environmental impact evaluation of a life cycle of the product by multiplying the true amount of virgin material of the item with the impact-coefficient data associated with the item.

3. The system of claim 2, wherein the controller and the plurality of data storages comprise a single integrated system.

4. The system of claim 2, wherein the plurality of data storages and the controller are connected via a network.

5. The system of claim 2, wherein the controller periodically monitors a database, from which the plurality of data storages obtain data, to update data status of the plurality of data storages.

6. A method of evaluating environmental impact associated with an activity, the activity comprising production of a unit of a product from an item comprising virgin material and recycled material, the method comprising:

storing in a first data storage a first data type associated with the item, the first data type comprising life cycle inventory data associated with the item, storing in a second data storage a second data type associated with the item, the second data type comprising grade information and recycle ratio information associated with the item, storing in a third data storage a third data type associated with the item, the third data type comprising modified life cycle inventory data associated with the item, providing a controller configured to compute a gross amount of virgin material for producing the unit by referring to the first data type, wherein the controller comprises a data evaluator, a correcting unit, a data storing unit, an item inputting unit and an impact evaluation unit, wherein the data evaluator is configured to retrieve the first data type from the first data storage, the correcting unit is configured to multiply the first data type into the third data type by applying the second data type, and the data storing unit is configured to store the third data type in the third data storage, computing a gross amount of virgin material for producing the unit by referring to life cycle inventory data associated with the item, multiplying the gross amount of virgin material by an amount of recycled material determined based on recycle ratio information associated with the item, and computing a true amount of virgin material for producing the unit by multiplying the gross amount of virgin material with grade information associated with the item, wherein the true amount of virgin material is stored as the third data type, wherein the step of computing a gross amount of virgin material comprises referring to the first data type, wherein the item inputting unit receives an item designator and third data type corresponding to the item designator, the impact evaluation unit retrieves impact-coefficient data for the item designator from a fourth data storage and multiplies the third data type with the impact-coefficient data.

7. The method of claim 6 comprising:

providing the first data storage as an inventory database configured to store a first data type associated with the item, the first data type comprising life cycle inventory data associated with the item, providing the second data storage as an additional information database configured to store a second data type associated with the item, the second data type comprising grade information and recycle ratio information associated with the item, providing the third data storage as a corrected inventory database configured to store a third data type associated with the item, the third data type comprising modified life cycle inventory data associated with the item, wherein the true amount of virgin material is stored in the third data storage as the third data type, and wherein the step of computing a gross amount of virgin material comprises referring to the first data type.

8. The method of claim 7, comprising:

providing the fourth data storage as an impact assessment database configured to store the impact-coefficient data associated with the item, providing a first analysis result associated with an environmental load caused by the item by listing the true amount of virgin material of the item, and providing a second analysis result associated with an environmental impact evaluation of a life cycle of the product by multiplying the true amount of virgin material of the item with the impact-coefficient data associated with the item.

9. A non-transitory computer readable medium storing computer instructions for performing a method of evaluating environmental impact associated with an activity, the activity comprising production of a unit of a product from an item comprising virgin material and recycled material, the method comprising:

providing a first data storage as an inventory database configured to store a first data type associated with the item, the first data type comprising life cycle inventory data associated with the item, providing a second data storage as an additional information database configured to store a second data type associated with the item, the second data type comprising grade information and recycle ratio information associated with the item, providing a third data storage as a corrected inventory database configured to store a third data type associated with the item, the third data type comprising modified life cycle inventory data associated with the item, providing a controller configured to compute a gross amount of virgin material for producing the unit by referring to the first data type, wherein the controller comprises a data evaluator, a correcting unit, a data storing unit, an item inputting unit and an impact evaluation unit, wherein the data evaluator is configured to retrieve the first data type from the first data storage, the correcting unit is configured to multiply the first data type into the third data type by applying the second data type, the data storing unit is configured to store the third data type in the third data storage, computing a gross amount of virgin material for producing the unit by referring to the first data type, multiplying the gross amount of virgin material by an amount of recycled material determined based on the recycle ratio information associated with the item, computing a true amount of virgin material for producing the unit by multiplying the gross amount of virgin material with grade information associated with the item, and storing the true amount of virgin material in the third data storage as the third data type, wherein the step of computing a gross amount of virgin material comprises referring to the first data type, and wherein the item inputting unit receives an item designator and third data type corresponding to the item designator, and the impact evaluation unit retrieves impact-coefficient data for the item designator from a fourth data storage, and multiplies the third data type with the impact-coefficient data.

10. The computer readable medium storing computer instructions according to claim 9, wherein the method comprises:

providing the fourth data storage as an impact assessment database configured to store the impact-coefficient data associated with the item, providing a first analysis result associated with an environmental load caused by the item by listing the true amount of virgin material of the item, and providing a second analysis result associated with an environmental impact evaluation of a life cycle of the product by multiplying the true amount of virgin material of the item with the impact-coefficient data associated with the item.

* * * * *